(12) United States Patent
Bhatt et al.

(10) Patent No.: US 9,032,093 B2
(45) Date of Patent: *May 12, 2015

(54) AUTOMATIC AGGREGATION OF INTER-DEVICE PORTS/LINKS IN A VIRTUAL DEVICE

(75) Inventors: Megh Bhatt, Santa Clara, CA (US); Harshad Nakil, San Jose, CA (US); Rajashekar Reddy, San Jose, CA (US); Saurabh Agarwal, Fremont, CA (US); Sai Ganesh Sitharaman, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/349,441

(22) Filed: Jan. 12, 2012

(65) Prior Publication Data

US 2012/0110206 A1     May 3, 2012

Related U.S. Application Data

(63) Continuation of application No. 12/651,351, filed on Dec. 31, 2009, now Pat. No. 8,122,127.

(51) Int. Cl.
*G06F 15/173*     (2006.01)
*H04L 12/709*     (2013.01)

(52) U.S. Cl.
CPC ............... *H04L 45/245* (2013.01); *Y02B 60/33* (2013.01)

(58) Field of Classification Search
None
See application file for complete search history.

(56) References Cited

U.S. PATENT DOCUMENTS

| | | | |
|---|---|---|---|
| 6,151,324 A | 11/2000 | Belser et al. | |
| 6,449,279 B1 | 9/2002 | Belser et al. | |
| 7,385,973 B1 * | 6/2008 | Johnson et al. | 370/389 |
| 7,457,256 B2 * | 11/2008 | Ivaldi et al. | 370/256 |
| 7,646,708 B2 | 1/2010 | McGee et al. | |
| 7,782,800 B2 * | 8/2010 | Swain | 370/257 |
| 8,516,129 B1 * | 8/2013 | Skene | 709/227 |
| 2005/0105560 A1 * | 5/2005 | Mann et al. | 370/503 |
| 2007/0223368 A1 * | 9/2007 | Ozaki | 370/216 |
| 2009/0010254 A1 * | 1/2009 | Shimada | 370/389 |
| 2009/0073989 A1 | 3/2009 | Cai et al. | |
| 2009/0109998 A1 | 4/2009 | Vinayagam et al. | |
| 2010/0329147 A1 * | 12/2010 | Nam et al. | 370/254 |
| 2011/0161489 A1 | 6/2011 | Bhatt et al. | |

* cited by examiner

*Primary Examiner* — John B Walsh
(74) *Attorney, Agent, or Firm* — Harrity & Harrity, LLP

(57) ABSTRACT

A virtual device includes multiple devices connected to operate as a single device. A first one of the devices is configured to determine that the first device connects to a second one of the devices via a first link; identify a second link; determine that the second link connects the first device to the second device; and automatically aggregate the first link and the second link to form a link aggregation with the second device based on determining that the first device connects to the second device via both the first and second links. The first device is further configured to transmit packets to the second device via the first and second links of the link aggregation.

20 Claims, 10 Drawing Sheets

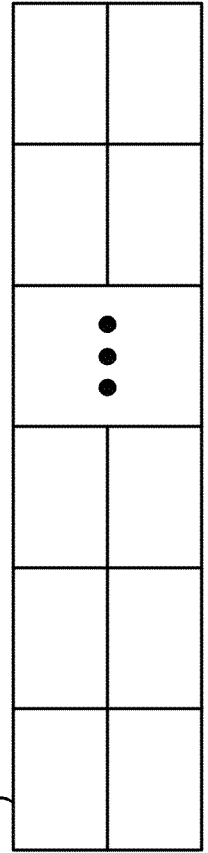
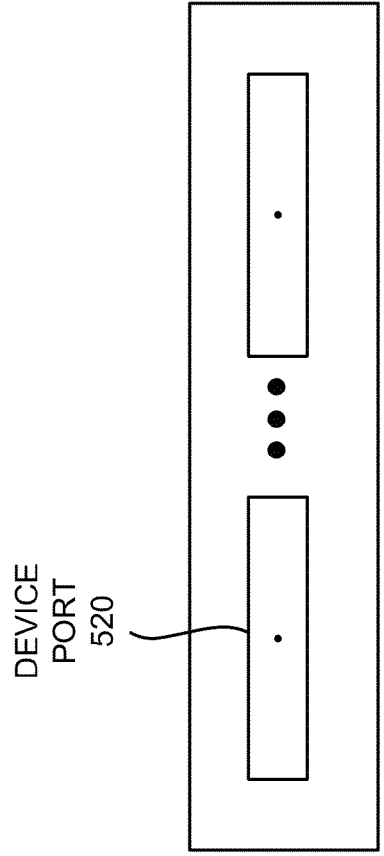
FIG. 5A
FIG. 5B

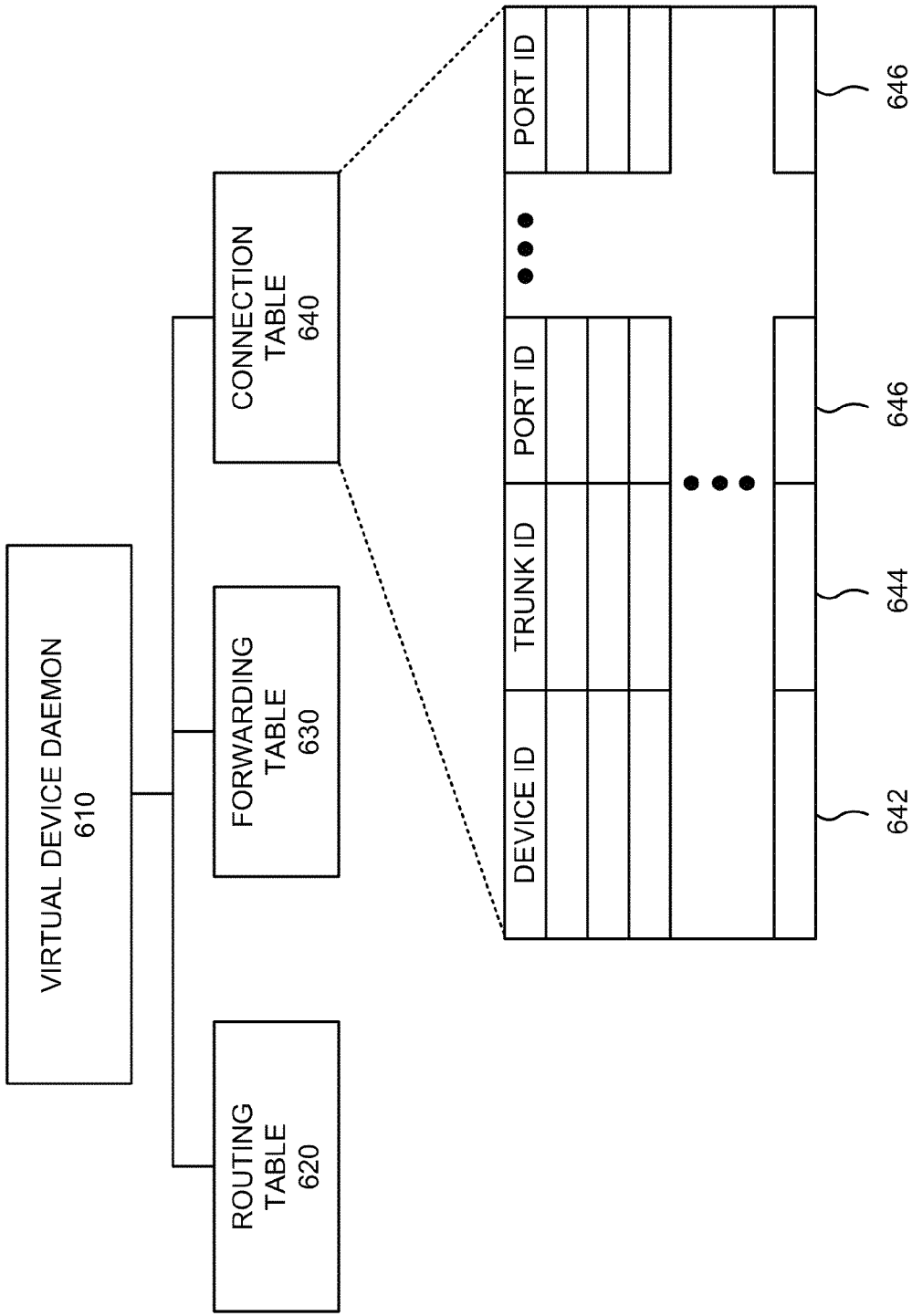

AUTOMATIC AGGREGATION OF INTER-DEVICE PORTS/LINKS IN A VIRTUAL DEVICE

RELATED APPLICATION

This application is a continuation of U.S. patent application Ser. No. 12/651,351, filed on Dec. 31, 2009, the disclosure of which is incorporated by reference herein.

BACKGROUND INFORMATION

A virtual device includes a collection of devices connected together to operate as a single device. It is common to provide some redundancy in the connections between the devices. Thus, if a particular link, between two devices, goes down, then there exists another path via which the two devices can communicate with each other.

SUMMARY

According to one implementation, a virtual device may include multiple devices connected to operate as a single device. A first one of the devices may discover a second one of the devices, determine that the first device connects to the second device via multiple links, and automatically aggregate the multiple links to form a link aggregation with the second device based on determining that the first device connects to the second device via the multiple links. The first device may transmit traffic to the second device via each of the multiple links of the link aggregation.

According to another implementation, a virtual system may include multiple devices connected to operate as a single device. A first one of the devices ("first device") may include means for determining that the first device is connected to a second one of the devices ("second device"), means for determining that the first device connects to the second device via multiple links, means for automatically aggregating the links to form a link aggregation with the second device based on determining that the first device connects to the second device via multiple links, and means for transmitting traffic to the second device over one or more of the links, of the link aggregation, using a load balancing technique.

According to a further implementation, a method may be performed by a first device of a group of devices connected to operate as a single device. The method may include determining that the first device connects to a second device, of the group of devices, via a first link; identifying a second link; determining that the second link connects the first device to the second device; automatically aggregating the first link and the second link to form a link aggregation with the second device based on determining that the first device connects to the second device via both the first and second links, and transmitting packets to the second device via the first and second links of the link aggregation, where one or more of the packets are transmitted via the first link and another one or more of the packets are transmitted via the second link.

BRIEF DESCRIPTION OF THE DRAWINGS

The accompanying drawings, which are incorporated in and constitute a part of this specification, illustrate one or more systems and/or method described herein and, together with the description, explain these systems and/or methods. In the drawings:

FIG. 5A is a diagram illustrating exemplary network ports of one or more network interfaces of FIG. 4;

FIG. 5B is a diagram illustrating exemplary device ports of one or more device interfaces of FIG. 4;

FIG. 6 is a diagram illustrating exemplary functional components of the controller of FIG. 3;

DETAILED DESCRIPTION

The following detailed description refers to the accompanying drawings. The same reference numbers in different drawings may identify the same or similar elements.

Figure 1:
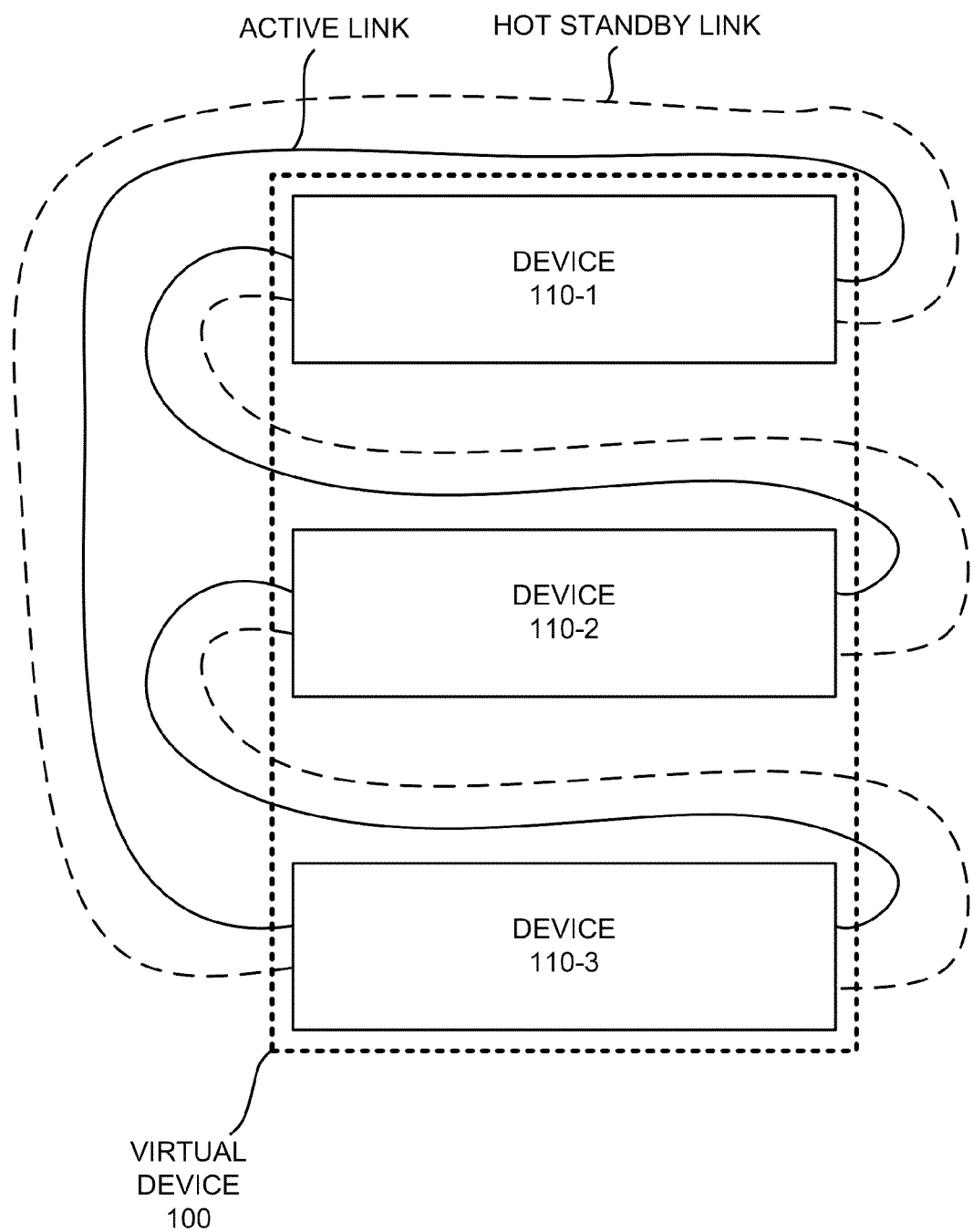
FIG. 1 is a diagram of a virtual device with redundant links between devices.

FIG. 1 is a diagram of a virtual device 100 with redundant links between devices. As shown in FIG. 1, virtual device 100 includes three devices 110-1, 110-2, and 110-3 (collectively referred to as "devices 110," and individually as "device 110") connected via an active link and a hot standby link. For example, device 110-1 connects to device 110-2 via an active link and a hot standby link and connects to device 110-3 via an active link and a hot standby link; device 110-2 connects to device 110-1 via an active link and a hot standby link and connects to device 110-3 via an active link and a hot standby link; and device 110-3 connects to device 110-1 via an active link and a hot standby link and connects to device 110-2 via an active link and a hot standby link.

Device 110 may use the active link to transmit traffic to another device 110. The hot standby link may be used in case of a failure on an active link. When a failure occurs on an active link, a device 110 may cause the traffic, for the failed link, to be switched over to the hot standby link. Some traffic loss occurs during the switch-over from the failed link to the hot standby link. Also, bandwidth, on the links, is not fully utilized in that no traffic is transmitted on the hot standby link unless a failure occurs on the active link.

According to an implementation described herein, a virtual device may automatically aggregate links between devices and transmit traffic over the aggregated links. The term "traffic," as used herein, may refer to a single data packet and/or control packet, or a series of data packets and/or control packets. The term "packet," as used herein, is intended to refer to any form or arrangement of information whether in packet form or in non-packet form.

Figure 2:
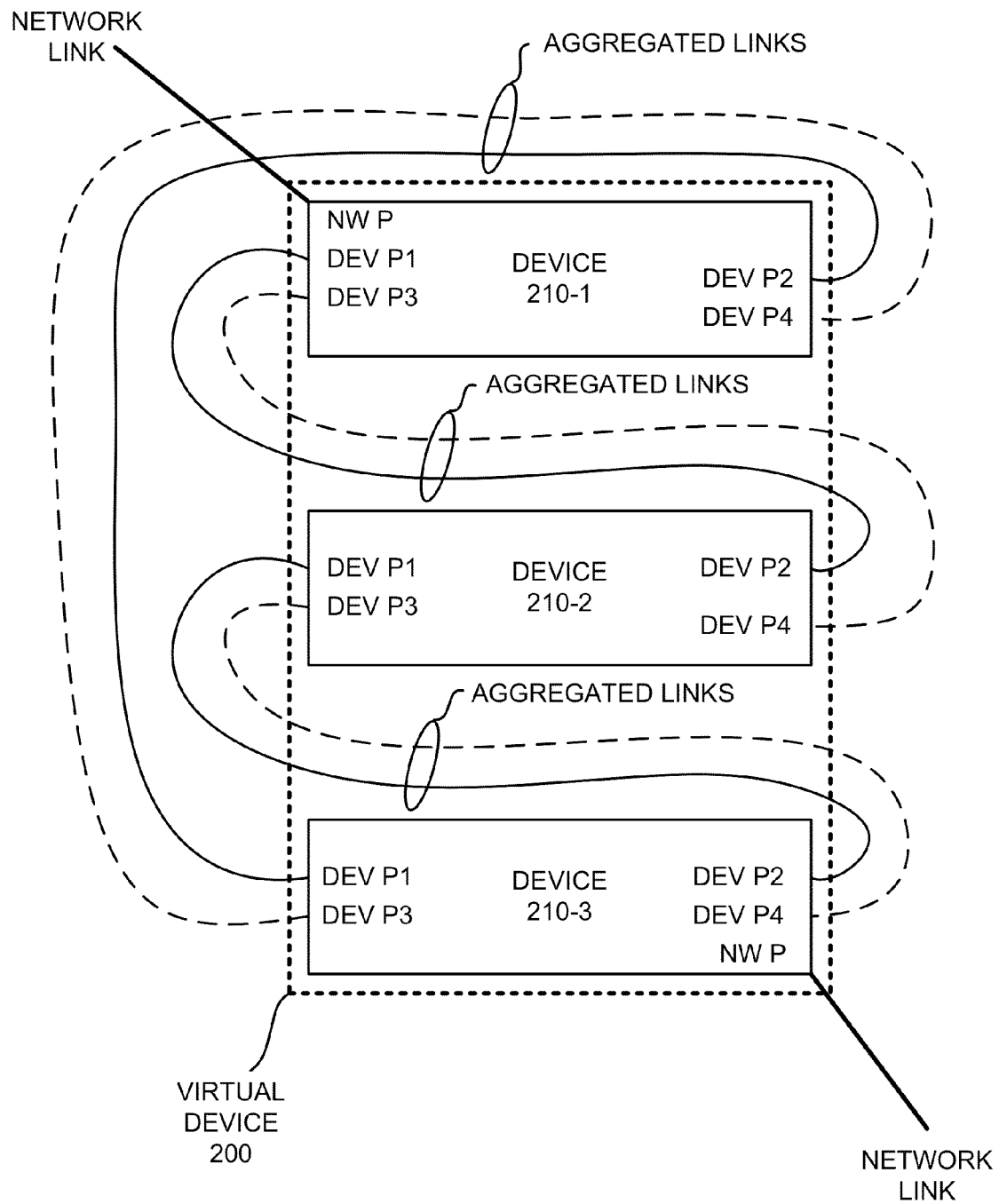
FIG. 2 is a diagram of an exemplary virtual device according to an implementation described herein.

FIG. 2 is a diagram of an exemplary virtual device 200 according to an implementation described herein. As shown in FIG. 2, virtual device 200 may include a collection of devices 210-1, 210-2, and 210-3 (referred to collectively as "devices 210," and individually as "device 210") that operate together as a single device. Device 210-1 may connect to device 210-2 via a set of device links (shown as aggregated links), and may connect to device 210-3 via a set of device links (shown as aggregated links). Device 210-2 may connect to device 210-1 via a set of device links (shown as aggregated links), and may connect to device 210-3 via a set of device links (shown as aggregated links). Device 210-3 may connect to device 210-1 via a set of device links (shown as aggregated links), and may connect to device 210-2 via a set of device links (shown as aggregated links).

While FIG. 2 shows a particular quantity of devices 210, the particular quantity of devices 210 is purely for illustration purposes. In practice, there may be fewer or additional devices 210 forming virtual device 200. Also, while FIG. 2 shows a particular topology of devices 210, the particular topology is purely for illustration purposes. In practice, the topology of devices 210, of virtual device 200, may differ. For example, there may be fewer or additional device links connecting any two devices 210. Further, the quantity of device links connecting one set of devices 210 may differ from the quantity of device links connecting another set of devices 210. Also, a particular device 210 may connect, via one or more device links, to one other device 210, or two or more other devices 210 in another implementation.

Device 210 may include a network device, such as a routing device, a switching device, a firewall device, a server device, or the like, or a non-network device, such as a computing device. While devices 210 can be implemented as different types of devices, in the following paragraphs, devices 210 will be described in terms of a network device.

As shown in FIG. 2, each device 210 may include a number of ports, such as one or more network ports (NW P) and/or one or more device ports (DEV P). A network port may include a port that connects to a link, such as a network link, that connects to a device external to virtual device 200. A device port may include a port that connects to a link, such as a device link, that connects one device 210 to another device 210 within virtual device 200.

Figure 3A:
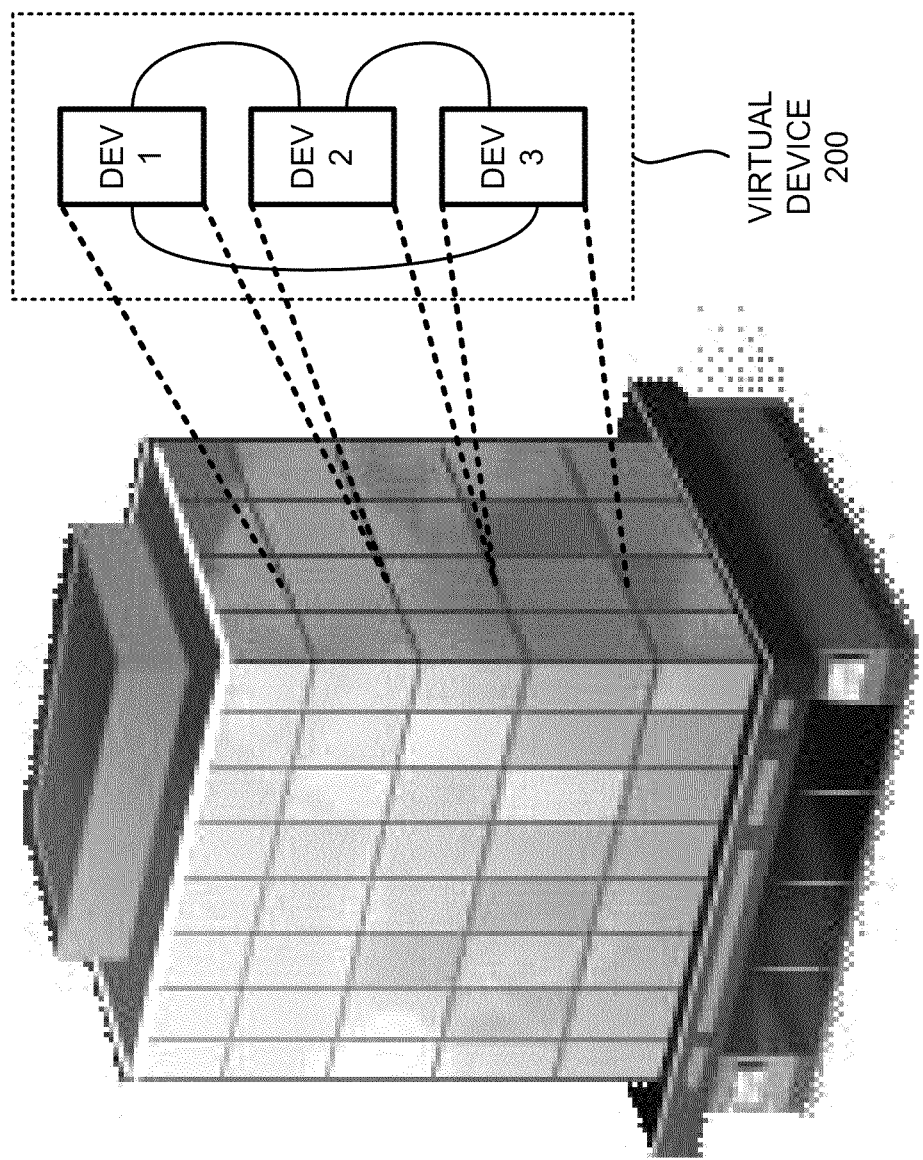
FIG. 3A is a diagram illustrating a possible distributed deployment of devices, of a virtual device, within a building.
Figure 3B:
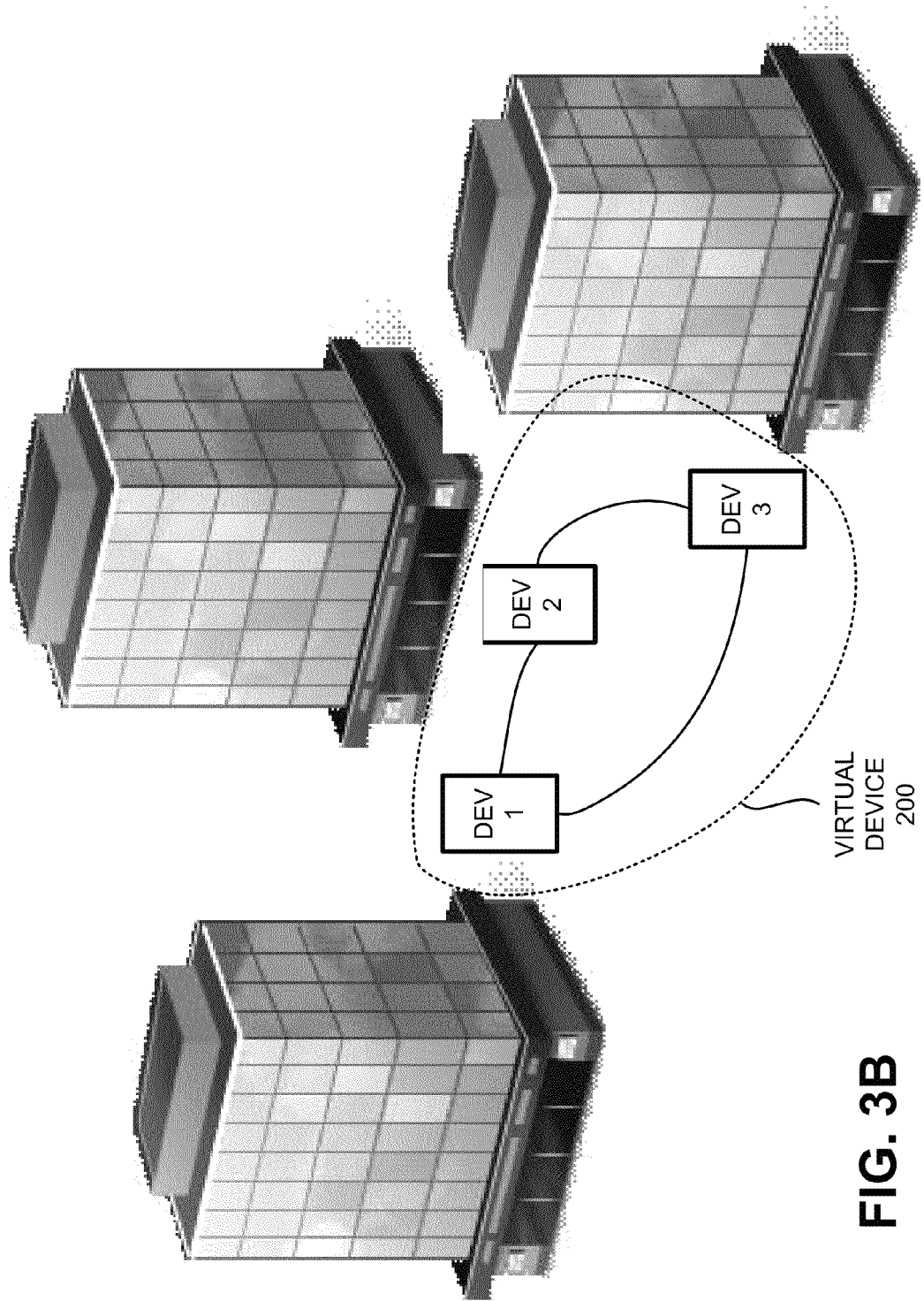
FIG. 3B is a diagram illustrating a possible distributed deployment of devices, of a virtual device, within a campus of buildings.

Devices 210, of virtual device 200, may be physically located on one or more racks in one or more buildings. Devices 210 may be physically located next to each other or separated by distances of up to 100 km or more (e.g., between 50 to 100 km). FIG. 3A is a diagram illustrating a possible distributed deployment of devices 210, of virtual device 200, within a building. For example, as shown in FIG. 3A, devices 210-1, 210-2, and 210-3 may be located on different floors of the building, and connected to form virtual device 200. FIG. 3B is a diagram illustrating a possible distributed deployment of devices 210, of a virtual device 200, within a campus of buildings. For example, as shown in FIG. 3B, devices 210-1, 210-2, and 210-3 may be located in different buildings, and connected to form virtual device 200.

Figure 4:
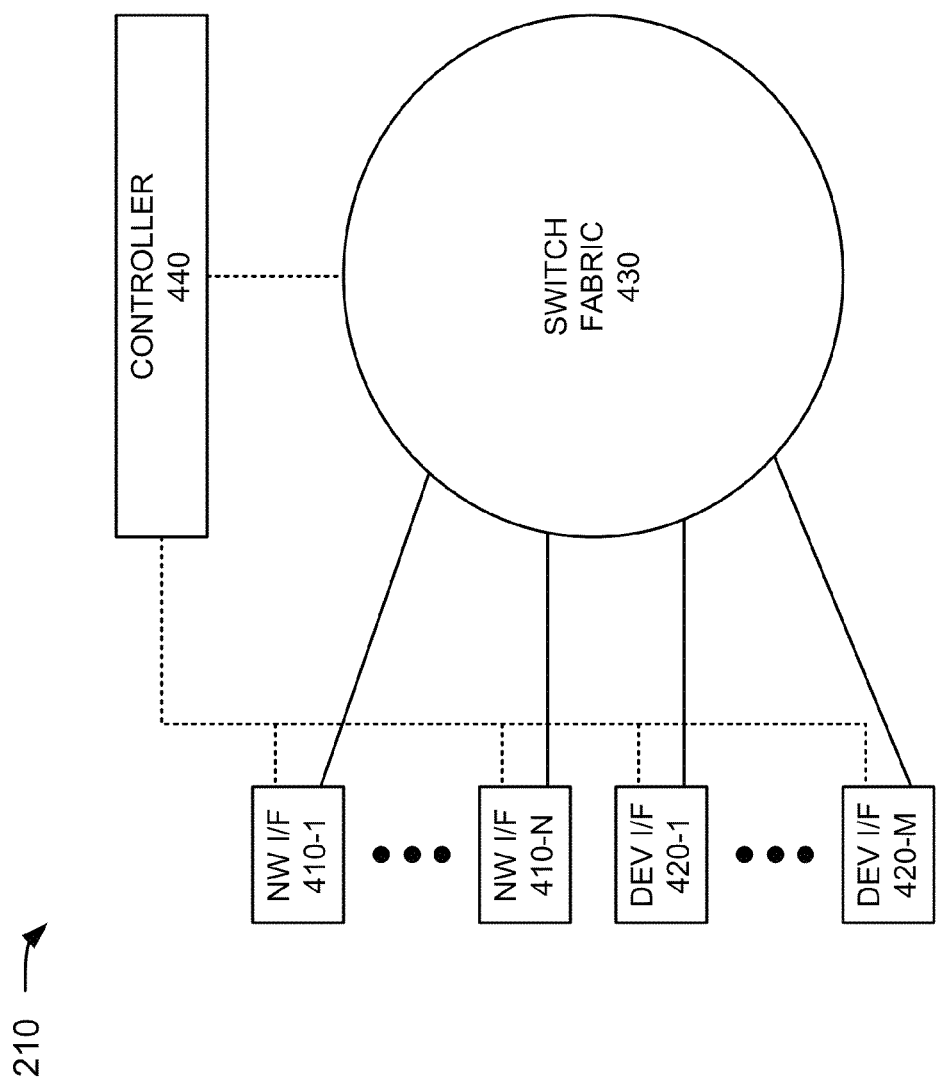
FIG. 4 is a diagram of exemplary components of a device of FIG. 2.

FIG. 4 is a diagram of exemplary components of a device 210. As shown in FIG. 4, device 210 may include network interfaces 410-1, . . . , 410-N (collectively referred to as "network interfaces 410," and individually as "network interface 410") (where N≥1), device interfaces 420-1, . . . , 420-M (collectively referred to as "device interfaces 420," and individually as "device interface 420") (where M≥1), switch fabric 430, and controller 440. In another implementation, device 210 may include fewer, additional, different, or differently arranged components than those illustrated in FIG. 4. Also, a function described as being performed by one of the components may be alternatively performed by another one of the components.

Network interface 410 may include a component to receive, transmit, and/or process traffic on a network link. For example, network interface 410 may include an Ethernet interface, an optical carrier (OC) interface, an asynchronous transfer mode (ATM) interface, or another type of interface. Network interface 410 may manage a set of one or more input ports via which packets can be received, a set of one or more output ports via which packets can be transmitted, and/or a set of one or more input/output ports via which packets can be received and transmitted. In one implementation, a network interface 410 may function as an input interface that receives packets on the network link and processes the packets. In another implementation, a network interface 410 may function as an output interface that processes packets and transmits the packets on the network link. In yet another implementation, a network interface 410 may function as both an input interface and an output interface.

FIG. 5A is a diagram illustrating exemplary network ports 510 of one or more network interfaces 410. Network ports 510 may be visible on the exterior structure of device 210. Network ports 510, illustrated in FIG. 5A, may be associated with one or more network interfaces 410. A network port 510 may be capable of transmitting packets for long distances (e.g., up to 100 km or more). In one implementation, a network port 510 may be converted to a port for a device interface 420. This may be beneficial to provide additional bandwidth for inter-device 210 communications, and/or to facilitate the connection of devices 210 at long distances.

Returning to FIG. 4, device interface 420 may include a component to receive, transmit, and/or process traffic on a device link (i.e., a link connecting two devices 210). For example, device interface 410 may include an Ethernet interface, an OC interface, or another type of interface. Device interface 420 may manage a set of one or more input ports via which packets can be received, a set of one or more output ports via which packets can be transmitted, and/or a set of one or more input/output ports via which packets can be received and transmitted. In one implementation, device interface 420 may function as an input interface that receives packets on a device link and processes the packets. In another implementation, device interface 420 may function as an output interface that processes packets and transmits the packets on a device link. In yet another implementation, device interface 420 may function as both an input interface and an output interface.

FIG. 5B is a diagram illustrating exemplary ports 520 of one or more device interfaces 420. Device ports 520 may be visible on the exterior structure of device 210. Device ports 520, illustrated in FIG. 5B, may be associated with one or more device interfaces 420.

Returning to FIG. 4, switch fabric 430 may include one or more switching planes to facilitate communication among interfaces 410/420 and/or controller 440. In one implementation, each of the switching planes may include a single or multi-stage switch of crossbar elements. In another implementation, each of the switching planes may include some other form of switching elements. Switch fabric 430 may also, or alternatively, include processors, memories, and/or paths that permit communication among controller 440 and interfaces 410/420.

Controller 440 may include one or more processors, microprocessors, application specific integrated circuits (ASICs), field programming gate arrays (FPGAs), and/or processing logic that may be optimized for networking and/or communications. Controller 440 may also include a static memory (e.g. a read only memory (ROM)), a dynamic memory (e.g. a random access memory (RAM)), onboard cache, and/or flash memory for storing data and/or machine-readable instructions. Controller 440 may communicate with other devices 210, of virtual device 200, to exchange information regarding the topology of virtual device 200 and/or to monitor the state of the device links. In one implementation, controller 440 may create a routing table based on the topology of virtual device 200, create a forwarding table based on the routing table, and making forwarding decisions based on the forwarding table.

As described below, controller 440 may automatically determine when device 210 (of which controller 440 is a component) connects to another device via more than one device link. In this case, controller 440 may aggregate traffic on the device links, thereby making efficient use of the bandwidth that exists between two devices 210 of virtual device 200.

FIG. 6 is a diagram illustrating exemplary functional components of controller 440. As shown in FIG. 6, controller 440 may include virtual device daemon 610, a routing table 620, a forwarding table 630, and a connection table 640. In another implementation, controller 440 may include fewer, additional, or different functional components than are shown in FIG. 6. Furthermore, a function described as being performed by one of the functional components may be alternatively performed by another functional component.

Virtual device daemon 610 may discover neighboring devices 210, may identify adjacencies, may aggregate device links, and/or may monitor the state (e.g., link up or down state) of the device links. For example, virtual device daemon 610 may send hello packets on the device links to discover neighboring devices 210. Virtual device daemon 610 may then perform a handshaking operation with a neighboring device 210. Virtual device daemon 610 may identify adjacencies by identifying which device port 520 connects to which neighboring device 210. Based on the adjacencies, virtual device daemon 610 may identify device links that can be aggregated. For example, if virtual device daemon 610 determines that device 210 (with which virtual device daemon 610 is associated) connects to a particular device 210 via device port 1 and device port 3, virtual device daemon 610 may determine that device ports 1 and 3 can be aggregated, thereby aggregating the device links connected to device ports 1 and 3.

Virtual device daemon 610 may generate and/or update routing table 620 based on the topology of virtual device 200. For example, virtual device daemon 610 may obtain information, regarding the topology of virtual device 200, from other devices 210 in virtual device 200. Virtual device daemon 610 may also obtain information, from devices 210, regarding the network links and/or device links to which devices 210 connect. Virtual device daemon 610 may store at least some of this information in routing table 620. Virtual device daemon 610 may use routing table 620 to identify, for example, an egress device 210 to which a received packet is to be sent before the packet exits virtual device 200.

Virtual device daemon 610 may generate forwarding table 630 based on routing table 620. For example, virtual device daemon 610 may identify a particular (next hop) device 210 to which to send a packet that is intended for an egress device 210. Virtual device daemon 610 may periodically perform a shortest path calculation (i.e., identify a path to use to reach a particular egress device 210) and store the result of the calculation in forwarding table 630. A technique for performing a shortest path calculation includes, among others, the Dijkstra algorithm or the Bellman-Ford algorithm. The shortest path calculation may take into account, not only the number of hops to reach a particular egress device 210, but also the cost of taking each of these hops. The cost of traversing a device link may be a function of the bandwidth available on that device link. In the case of a link aggregation, the cost may be a function of the combined bandwidth of the aggregated device links.

In one implementation, virtual device daemon 610 may perform a new shortest path calculation each time that the topology of virtual device 200 changes (e.g., when a device link comes up or goes down, when a new device 210 is added, etc.). In another implementation, virtual device daemon 610 may perform a shortest path calculation at another time that may be independent of the changing of the topology of virtual device 200. In one implementation, forwarding table 630 may store information that identifies a particular (next hop) device 210 for a particular egress device 210.

Virtual device daemon 610 may generate and/or update connection table 640 based on the identified adjacencies and determined device link aggregations. For example, virtual device daemon 610 may determine that two device links can be aggregated and may store information regarding the device link aggregation in connection table 640.

Connection table 640 may include a device identifier (ID) field 642, a trunk ID field 644, and one or more port ID fields 646. In another implementation, connection table 640 may contain fewer, additional, or different fields than are shown in FIG. 6.

Device ID field 642 may store information identifying a neighboring device 210, such as a numerical identifier, an address, or some other information that uniquely identifies a device 210 in virtual device 200. Trunk ID field 644 may store information (e.g., a trunk identifier) identifying a particular adjacency with neighboring device 210 identified in device ID field 642. In the case of a link aggregation (i.e., two or more device links) that exists with neighboring device 210 identified in device ID field 642, the trunk identifier may represent the combination of two or more device ports 520 associated with the link aggregation. In the case of no link aggregation that exists with neighboring device 210, the trunk identifier may represent the single device port 520 associated with the device link connecting to neighboring device 210. Port ID field 646 may store information that uniquely identifies a device port 520 to which neighboring device 210, identified in device ID field 642, connects via a device link. When a link aggregation exists with neighboring device 210, then one or more other port ID fields 646 may store information that uniquely identifies other device ports 520 to which neighboring device 210, identified in device ID field 642, connects via a device link.

Virtual device daemon 610 may program one or more components of device 210 with the information in connection table 630 so that these one or more components may utilize the bandwidth of the link aggregation by transmitting packets (e.g., control and/or data packets) over all of the device links of the link aggregation.

Figure 7:
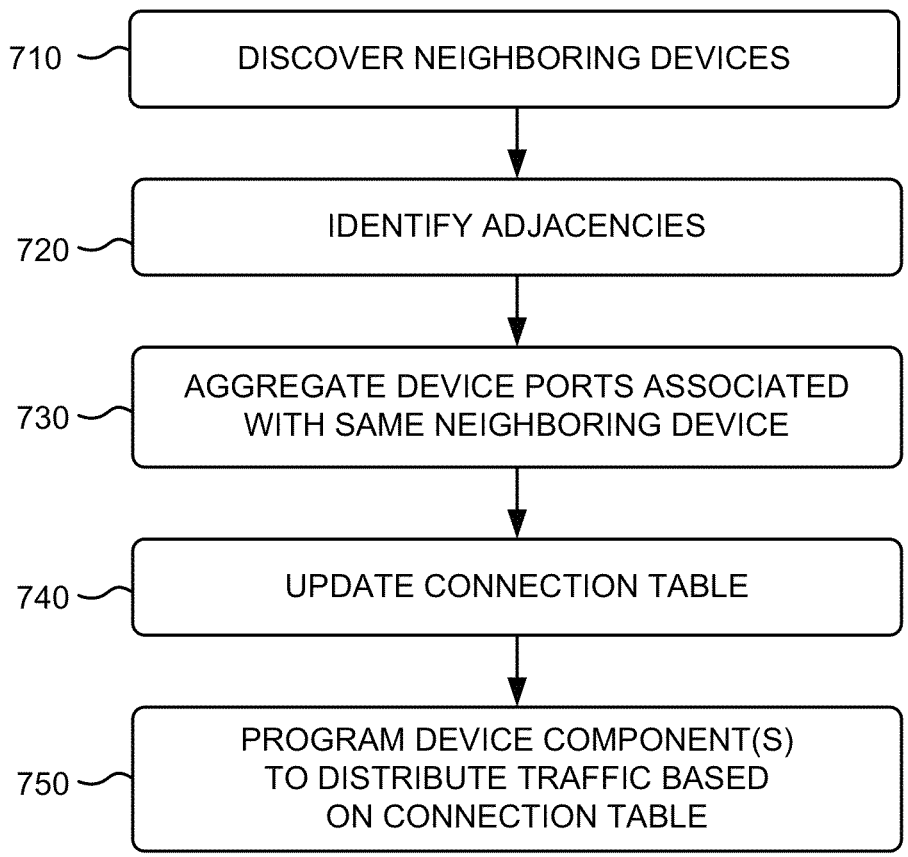
FIG. 7 is a flowchart of an exemplary process for automatically aggregating ports of a virtual device.

FIG. 7 is a flowchart of an exemplary process 700 for automatically aggregating ports of a virtual device. Process 700 may be performed by a device 210 in virtual device 200. In one implementation, process 700 may be performed separately by each device 210 in virtual device 200. For the description to follow, process 700 will be described as being performed by a particular device 210 of virtual device 200.

Process 700 may include discovering neighboring devices 210 (block 710). For example, virtual device daemon 610, of the particular device 210, may be notified, by another component of the particular device 210, of an active device link (i.e., a device link that is in the up state). In other words, when a device interface 320 determines that an active device link is connected to one of its device ports 520, device interface 320 may notify virtual device daemon 610. Virtual device daemon 610 may transmit hello packets on all active device links. A neighboring device 210, that receives a hello packet, may respond to the hello packet with a reply (e.g., an acknowledgement).

In response to a reply from a neighboring device 210, virtual device daemon 610 may perform a three-way handshake with a virtual device daemon 610 of the neighboring device 210 (hereinafter "neighboring virtual device daemon 610"). For example, virtual device daemon 610 may send a packet to neighboring virtual device daemon 610 indicating that the particular device 210 has seen the neighboring device 210 for the first time. The neighboring virtual device daemon 610 may respond by sending a packet, back to virtual device daemon 610, indicating that the neighboring device 210 has also seen the particular device 210. Virtual device daemon 610 may send another packet to neighboring virtual device daemon 610 confirming that the particular device 210 has seen the neighboring device 210 and that the neighboring device 210 has seen the particular device 210, thereby completing the three-way handshake.

Adjacencies may be identified (block 720). For example, virtual device daemon 610 may identify, for each of the neighboring devices 210 that virtual device daemon 610 has discovered, a device port 520 via which the particular device 210 connects to the neighboring device 210 via a device link. As a result of identifying the adjacencies, virtual device daemon 610 may know which neighboring devices 210 that the particular device 210 connects to and via which device ports 520.

Device ports 520, associated with a same neighboring device 210, may be aggregated (block 730). For example, virtual device daemon 610 may identify a neighboring device 210 to which the particular device 210 connects via multiple device ports 520. In this case, virtual device daemon 610 may aggregate the multiple device ports 520, thereby aggregating the bandwidth available on the device links connected to these multiple device ports 520.

Connection table 640 may be updated (block 740). For example, virtual device daemon 610 may create, or update, an entry in connection table 640 to reflect the link aggregation of the multiple device ports 520. For aggregated device ports 520, virtual device daemon 610 may assign a trunk identifier to the link aggregation. Virtual device daemon 610 may store information identifying the neighboring node 210 in device ID field 642, the trunk identifier in trunk ID field 644, and information identifying the multiple device ports 520 in port ID fields 646.

Virtual device daemon 610 may create, or update, an entry in connection table 640 for each device port 520 via which the particular device 210 connects to a neighboring device 210, regardless of whether that device port 520 has been aggregated. For a non-aggregated device port 520, virtual device daemon 610 may assign a trunk identifier to the non-aggregated device port 520. Virtual device daemon 610 may store information identifying the neighboring node 210 in device ID field 642, the trunk identifier in trunk ID field 644, and information identifying the non-aggregated device port 520 in port ID field 646.

One or more device components may be programmed to distribute traffic based on connection table 640 (block 750). For example, virtual device daemon 610 may program one or more hardware components, of the particular device 210, to distribute traffic based on the information in connection table 640. For a link aggregation, the one or more hardware components may distribute traffic, on the device links, using a load balancing technique or some other technique that may attempt to fully utilize the bandwidth on the device links.

Figure 8:
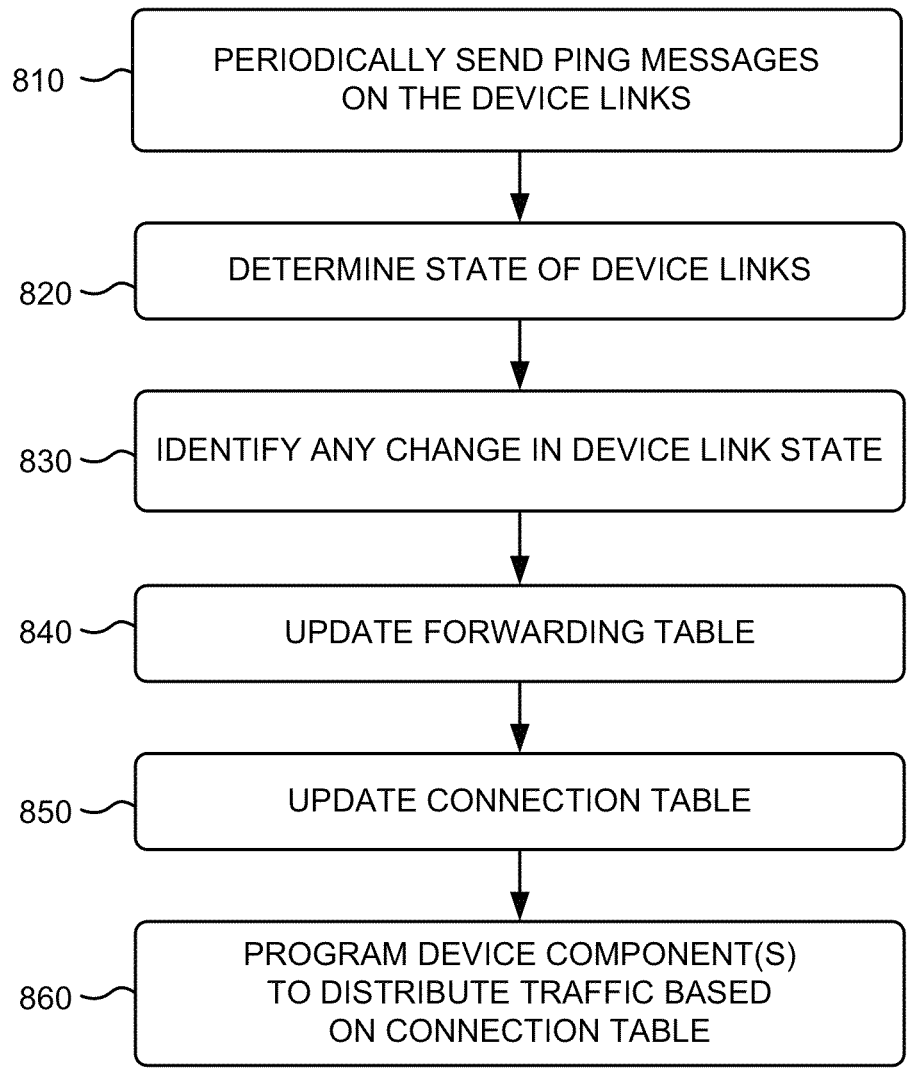
FIG. 8 is a flowchart of an exemplary process for handling a state change of a device link.

FIG. 8 is a flowchart of an exemplary process 800 for handling a state change of a device link. Process 800 may be performed by a device 210 in virtual device 200. In one implementation, process 800 may be performed separately by each device 210 in virtual device 200. For the description to follow, process 800 will be described as being performed by a particular device 210 of virtual device 200.

Process 800 may include periodically sending ping messages on the device links (block 810). For example, virtual device daemon 610 may periodically (e.g., at some designated frequency) transmit ping messages (e.g., hello and/or keep alive packets) on all of the device links to which its device ports 520 connect. The purpose of the ping messages is to monitor the state of the device links. Device links can be generally in one of two states: a link up state or a link down state. The link up state may reflect that the device link is operable and the components, on a neighboring device 210 connected to that device link, are operable and capable of communicating on the device link. The link down state may reflect that either the device link has failed (i.e., the device link is inoperable) or that the components, on a neighboring device 210 connected to that device link, have failed (i.e., the device link is operable, but a soft failure or a component failure has occurred at neighboring device 210). Thus, the ping messages can detect these soft failures or component failures that do not actually cause the device link to become inoperable.

The state of the device links may be determined (block 820), and a change in the state of the device links may be identified (block 830). For example, virtual device daemon 610 may determine whether responses were received on the device links in response to the ping messages. In one implementation, virtual device daemon 610 may identify that a device link is in the down state when a single response has not been received on that device link. In another implementation, virtual device daemon 610 may identify that a device link is in the down state when no response has been received on that device link for a particular number of ping messages transmitted on that device link. For example, virtual device daemon 610 may determine that a device link is in the down state when no response has been received for three consecutive ping messages.

When there is a change in the link state of a device link, virtual device daemon 610 may update forwarding table 630 (block 840). For example, virtual device daemon 610 may perform a new shortest path calculation based on the change in the link state. When a device link, of a link aggregation, changes to the down state, then virtual device daemon 610 may change the cost of transmitting traffic over the remaining device link(s) as a function of the bandwidth of the remaining device link(s). When a device link changes to the up state (e.g., when a device link that was previously in the down state changes to the up state or when a new device link is added), virtual device daemon 610 may change the cost of transmitting traffic over the device link as a function of the bandwidth of the device link. If the device link forms a link aggregation with one or more other device links, then virtual device daemon 610 may change the cost of transmitting over the link aggregation as a function of the bandwidth of the link aggregation. Virtual device daemon 610 may perform a new shortest path calculation based on the changed cost. Virtual device daemon 610 may update forwarding table 630, if necessary, based on the new calculations.

When there is a change in the link state of a device link, virtual device daemon 610 may also update connection table 640 (block 850). In one implementation, virtual device daemon 610 may update its adjacencies by, for example, identifying a new adjacency, removing a previously-identified adjacency, or changing an existing adjacency. As a result of updating the adjacencies, virtual device daemon 610 may know which neighboring devices 210 that the particular device 210 connects to and via which device ports 520.

Virtual device daemon 610 may identify a neighboring device 210 to which the particular device 210 connects via multiple device ports 520, a neighboring device 210 to which the particular device 210 connects via a single device port 520, and/or a neighboring device 210 to which the particular device 210 no longer connects. For a neighboring device 210 to which the particular device 210 connects via multiple device ports 520, virtual device daemon 610 may aggregate the multiple device ports 520, thereby aggregating the bandwidth available on the device links connected to these multiple device ports 520.

Virtual device daemon 610 may update connection table 640 based on the updating of the adjacencies. For example, virtual device daemon 610 may create, update, or remove an entry in connection table 640 to reflect the updated adjacencies. For a new link aggregation, virtual device daemon 610 may assign a trunk identifier to the link aggregation. In one implementation, virtual device daemon 610 may create a new entry in connection table 640 for the link aggregation and remove an existing entry relating to a device port 520 of the new aggregation. In another implementation, virtual device daemon 610 may update the existing entry, in connection table 640, to reflect the new link aggregation. In either event, the entry, in connection table 640, may store information identifying the neighboring node 210 in device ID field 642, the trunk identifier in trunk ID field 644, and information identifying the multiple device ports 520 in port ID fields 646.

For a change to an existing link aggregation, virtual device daemon 610 may update the entry, in connection table 640, corresponding to the link aggregation. For example, virtual device daemon 610 may delete information regarding one or more device ports 520 that is/are no longer part of the link aggregation. This may result in one or more device ports 520 continuing to connect to neighboring device 210 associated with the entry in connection table 640. For an adjacency that no longer exists, virtual device daemon 610 may remove an entry from connection table 640.

One or more device components may be programmed to distribute traffic based on connection table 640 (block 860). For example, virtual device daemon 610 may program one or more hardware components, of the particular device 210, to distribute traffic based on the information in connection table 640. In the case of a link aggregation, the one or more hardware components may distribute traffic, on the device links of the link aggregation, using a load balancing technique or some other technique that may attempt to fully utilize the bandwidth on the device links. In the case of no link aggregation, then the one or more hardware components may transmit traffic over the device link connected to the neighboring device 210. As a result, practically no traffic is lost due to a change in the device link state.

Figure 9:
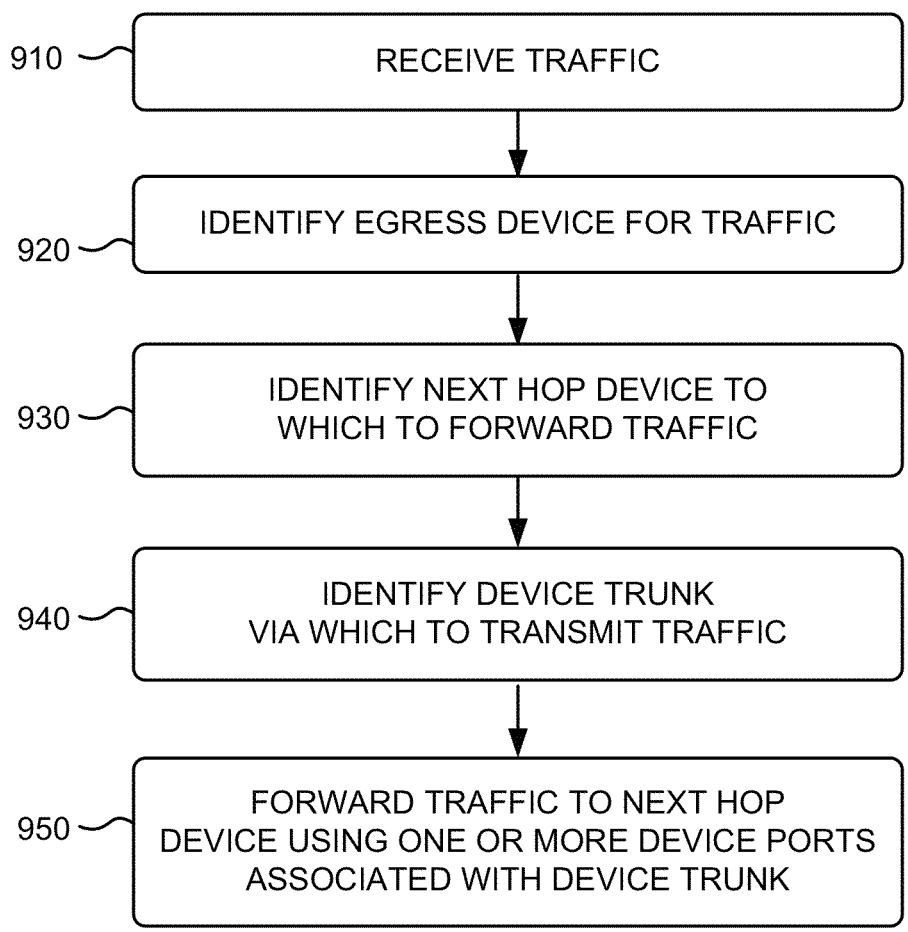
FIG. 9 is a flowchart of an exemplary process for transmitting traffic within a virtual device.

FIG. 9 is a flowchart of an exemplary process for transmitting a packet within virtual device 200. Process 900 may be performed by a device 210 in virtual device 200. In one implementation, process 900 may be performed separately by each device 210 in virtual device 200. For the description to follow, process 900 will be described as being performed by a particular device 210 of virtual device 200.

Process 900 may include receiving traffic (block 910). For example, assume that the particular device 210 receives traffic (e.g., a data packet or a control packet) on a network link via a network port 510 of a network interface 310. The traffic may include certain information, such as information identifying the destination of the traffic (e.g., an address of the destination of the traffic).

An egress device 210, within virtual device 200, for the traffic may be identified (block 920). For example, the particular device 210 may perform a lookup operation in routing table 620 to determine, based on the destination of the traffic, the identity of an egress device 210 via which the traffic is to be transmitted for the traffic to reach the destination. In one implementation, the particular device 210 may use the information regarding the destination of the traffic to identify a device 210 (i.e., the egress device 210), within virtual device 200, that has the network port 510 via which the traffic is to be transmitted.

The next hop device 210, to which to forward the traffic, may be identified (block 930). For example, the particular device 210 may perform a lookup operation in forwarding table 630 to determine, based on the identity of egress device 210, the identity of a next hop device 210 via which the traffic is to be transmitted for the traffic to reach egress device 210 based on its shortest path calculation. In one implementation, the particular device 210 may use the information regarding the egress device 210 to identify a device 210 (i.e., the next hop device 210), within virtual device 200, to which the traffic is to be transmitted.

A device trunk, via which to transmit the traffic, may be identified (block 940). For example, the particular device 210 may determine, based on information from connection table 630 and based on the identity of next hop device 210, the identity of a device trunk via which the traffic is to be transmitted for the traffic to reach next hop device 210. As described above, a device trunk may correspond to a single device port 520 or an aggregation of multiple device ports 520.

The traffic may be forwarded to the next hop device 210 via one or more device ports 520 associated with the device trunk (block 950). For example, as described above, in a situation where the device trunk corresponds to a device link aggregation, one or more hardware components of the particular device 210 may be programmed to use a load balancing technique, or the like, to distribute the traffic over the multiple device ports 520 associated with the device link aggregation. In a situation where the device trunk corresponds to a single device link, one or more hardware components of the particular device 210, may be programmed to transmit data via the device port 530 associated with the single device link. A device interface 320, responsible for the identified device port(s) 520, may receive the traffic and output the traffic on the device link(s) connected to the identified device port(s) 520.

If the next hop device 210 is the egress device, the egress device 210 may process the traffic and transmit the traffic on a network link, where the traffic exits virtual device 200. If the next hop device 210 is not the egress device, the next hop device 210 may process the traffic in a manner similar to that described above and forward the traffic to another next hop device 210 or the egress device 210. Eventually, when the traffic reaches the egress device 210, the egress device 210 may process the traffic and transmit the traffic on a network link, where the traffic exits virtual device 200.

An implementation, described herein, may automatically identify device links, within a virtual device, that may be aggregated and aggregate the links so that the bandwidth of the links may be efficiently utilized. When a link changes state, the link may be easily added to or removed from a link aggregation and communication may continue with minimal-to-no loss of traffic. Also, shortest path calculations may be updated to reflect the state change of the link so that traffic may be efficiently transmitted within the virtual device.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7-9, the order of the blocks may be modified in other implementations. Further, non-dependent blocks may be performed in parallel.

Also, certain portions of the implementations have been described as "logic" or a "component" that performs one or more functions. The terms "logic" or "component" may include hardware, such as a processor, an ASIC, or a FPGA, or a combination of hardware and software (e.g., software running on a processor).

Further, three separate tables have been described: a routing table, a forwarding table, and a connection table. In another implementation, two or more of these tables may be combined into a single table. The term "table," as used herein, may refer to any searchable form or arrangement of data within a memory device.

Also, reference has been made to aggregating links. It is intended that the aggregation of links be synonymous to the aggregation of the ports to which these links are connected.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A system comprising:
a virtual device that includes a plurality of network devices that are connected via a plurality of links to operate as a single device,
a first device, of the plurality of network devices, including a plurality of first ports and at least one other port, the plurality of first ports to:
transmit data to at least one other network device of the plurality of network devices, and
receive data from the at least one other network device of the plurality of network devices,
the first device being to:
transmit, via the plurality of first ports, messages to discover one or more other network devices of the plurality of network devices,
the plurality of first ports being connected to the plurality of links,
identify, based on discovering the one or more other network devices, one or more of the plurality of first ports that are connected to each of the one or more other network devices,
determine, based on identifying the one or more of the plurality of first ports that are connected to each of the one or more other network devices, that:
a first link, of the plurality of links, connects the first device to a second device, of the one or more other network devices, via a first port of the plurality of first ports, and
a second link, of the plurality of links, connects the first device to the second device via a second port of the plurality of first ports,
aggregate, based on one or messages transmitted from the first device to the second device and one or more messages received by the first device and from the second device and based on adjacency information associated with the first device and the second device, the first port and the second port to form a port aggregation,
the one or more messages received by the first device and from the second device being based on the one or messages transmitted from the first device to the second device, and
the port aggregation forming a link aggregation between the first link and the second link,
update, based on topology information associated with the virtual device, a routing table,
the routing table including information associated with the first link, information associated with the second link, and information associated with a particular network device, of the plurality of network devices, that receives a packet before the packet is transmitted from the virtual device,
update, based on aggregating the first port and the second port to form the port aggregation and based on the adjacency information, a connection table to include information associated with aggregating the first port and the second port,
the connection table being different than the routing table,
output, over the link aggregation, data to the second device via the port aggregation,
receive information associated with a change in a state of at least one of the first link or the second link,
update, based on the received information, a forwarding table to include information associated with a calculation that is performed based on the change in the state,
the forwarding table being different than the connection table and being different than the routing table, and
the forwarding table being generated based on the information included in the routing table, and
update, based on the received information, the connection table to include information associated with the change in the state.

2. The system of claim 1, where, when outputting the data to the second device, the first device is further to:
distribute the data between the first port and the second port to balance a load associated with the first port and the second port.

3. The system of claim 1, where the first device is further to: determine a failure of the first link,
remove the first link from the link aggregation, and
transmit the data to the second device via the second link.

4. The system of claim 1, where the first device is further to:
receive topology information regarding a topology of the plurality of network devices, and
update the received topology information based on forming the link aggregation,
where, when outputting the data, the first device is to:
output the data based on the updated topology information.

5. The system of claim 4, where, when outputting the data, the first device is further to:
perform, based on the received topology information, a shortest path calculation to determine a path, for outputting the data to the second device, as a function of a total bandwidth available on the first link and the second link.

6. The system of claim 1, where the at least one other port is to:
transmit data to at least one device that is not included in the plurality of devices, and
receive data from the at least one device that is not included in the plurality of devices.

7. A method comprising:
transmitting, by a network device and via a plurality of first ports, messages to discover a plurality of devices associated with the network device;
the network device including the plurality of first ports and at least one other port,
the plurality of first ports to:
transmit data to at least one device of the plurality of devices, and
receive data from the at least one device of the plurality of devices,
the plurality of first ports being connected to a plurality of links for connecting the network device to the plurality of devices, and
the network device and the plurality of devices connecting together to form a virtual device that operates as a single device,
identifying, by the network device and based on discovering the plurality of devices, one or more of the plurality of first ports connected, respectively, to each of the plurality of devices;
determining, based on identifying the respective one or more of the plurality of ports connected to each of the plurality of devices, two or more links that connect the network device to a first device of the plurality of devices,
a first link, of the two or more links, connecting the network device to the first device via a first port of the plurality of first ports, and
a second link, of the two or more links, connecting the network device to the first device via a second port, of the plurality of first ports;
aggregating, by the network device and based on one or more messages transmitted from the network device to the first device and one or more messages received by the network device and from the first device and based on adjacency information associated with the network device and the first device, the first port and the second port to form a port aggregation,
the one or more messages received by the network device and from the first device being based on the one or messages transmitted from the network device to the first device, and
the port aggregation forming a link aggregation between the first link and the second link;
updating, by the network device and based on topology information associated with the virtual device, a routing table,
the routing table including information associated with the first link, information associated with the second link, and information associated with a particular device, of the plurality of devices, that receives a packet before the packet is transmitted from the virtual device;
updating, by the network device and based on aggregating the first port and the second port to form the port aggregation and based on the adjacency information, a connection table to include information associated with aggregating the first port and the second port,
the connection table being different than the routing table;
transmitting, by the network device and over the link aggregation, data to the first device via the port aggregation,
receiving, by the network device, information associated with a change in a state of at least one of the first link or the second link;
updating, by the network device and based on the received information, a forwarding table to include information associated with a calculation that is performed based on the change in the state,
the forwarding table being different than the connection table and being different than the routing table, and
the forwarding table being generated based on the information included in the routing table; and
updating, by the network device and based on the received information, the connection table to include information associated with the change in the state.

8. The method of claim 7, further comprising:
identifying, based on discovering the plurality of devices, a third link that connects the network device to a second device, of the plurality of devices, via a third port, of the plurality of first ports, and a fourth link that connects the network device to the second device via a fourth port, of the plurality of first ports,
the second device being different from the first device; and
transmitting other data to the second device via a second link aggregation formed with the second device,
the second link aggregation including a link for transmitting the other data between the network device and the second device.

9. The method of claim 7, where transmitting the data to the first device includes:
distributing the data on the first port and the second port to balance a load associated with the first port and a load associated with the second port.

10. The method of claim 7, further comprising:
transmitting a portion of the data to the first device via the link aggregation;
determining a failure of the first link after transmitting the portion; and
transmitting a remaining portion of the data to the first device via the second link.

11. The method of claim 7, further comprising:
receiving topology information regarding a topology of the plurality of devices; and
updating the received topology information to include information identifying the link aggregation formed with the first device; and
where transmitting the data includes:
transmitting the data to the first device via the link aggregation based on the updated topology information.

12. The method of claim 11, where transmitting the data further includes:
performing, based on the received topology information, a shortest path calculation to determine a path, for transmitting the data to the first device, as a function of a total bandwidth available on links associated with the first port and the second port,
the links associated with the first port and the second port including the first link and the second link.

13. A network device comprising:
a memory to store instructions; and
a processor to execute the instructions to:
transmit, via a plurality of ports, messages to discover first devices associated with the network device,
the network device including the plurality of ports, the plurality of ports to:
transmit data to at least one first device of the first devices associated with the network device,
receive data from the at least one first device,
the network device being connected to the first devices to form a virtual device that operates as a single device within a network, and
the plurality of ports being connected to a plurality of links for connecting the network device to the first devices,
identify, based on discovering the first devices, one or more ports, of the plurality of ports, that are connected, respectively, to each of the first devices,
determine, based on identifying the one or more ports connected, respectively, to each of the first devices, that the network device is connected to a particular device, of the first devices, via:
a first link connected to a first port of the plurality of ports, and
a second link connected to a second port of the plurality of ports,
aggregate, based on one or more messages transmitted from the network device to the particular device and one or more messages received by the network device and from the particular device and based on adjacency information associated with the network device and the particular device, the first port and the second port to form a port aggregation,
the one or more messages received by the network device and from the particular device being based on the one or messages transmitted from the network device to the particular device, and
the port aggregation forming a link aggregation between the first link and the second link,
update, based on topology information associated with the virtual device, a routing table,
the routing table including information associated with the first link, information associated with the second link, and information associated with a particular first device, of the first devices, that receives a packet before the packet is transmitted from the virtual device,
update, based on aggregating the first port and the second port to form the port aggregation and based on the adjacency information, a connection table to include information associated with aggregating the first port and the second port,
the connection table being different than the routing table,
transmit, over the link aggregation, data to the particular device via the port aggregation,
receive information associated with a change in a state of at least one of the first link or the second link,
update, based on the received information, a forwarding table to include information associated with a calculation that is performed based on the change in the state,
the forwarding table being different than the connection table and being different than the routing table, and
the forwarding table being generated based on the information included in the routing table, and
update, based on the received information, the connection table to include information associated with the change in the state.

14. The network device of claim 13, where, when transmitting the data to the particular device, the processor is to:
distribute the data on the first link and the second link to balance a load associated with the first port and the second port.

15. The network device of claim 13, where the processor is further to:
receive other data from the particular device via the link aggregation, and
transmit the other data to another network device via a network port connected to a third link.

16. The network device of claim 13, where, when transmitting the data to the particular device, the processor is further to:
transmit a portion of the data to the particular device via the first link,
determine a failure of the first link after transmitting the portion, and
transmit a remaining portion of the data to the particular device via the second link.

17. The network device of claim 13, where the processor is further to:
receive data from the first devices,
the data received from the first devices comprising data to be transmitted to one or more devices external to a network associated with the network device and the first devices, and
forward, via a network port, the data to another network device for transmitting the data to the one or more devices external to the network.

18. The network device of claim 13, where the processor is further to:
receive topology information regarding a topology of the first devices based on transmitting the messages, and
update the received topology information,
the updated topology information including information identifying the link aggregation, and
where, when transmitting the data to the particular device, the processor is further to:
transmit the data to the particular device based on the updated topology information.

19. The network device of claim 13, where, when transmitting the data to the particular device, the processor is further to:
  perform, based on the topology information, a shortest path calculation to determine a path, for transmitting the data to the particular device, as a function of a total bandwidth available on the first link and the second link, and
  transmit, via the link aggregation, the data to the particular device based on performing the shortest path calculation to determine the path.

20. The network device of claim 13, where the network device includes a network port to:
  transmit data to another network device that is different from the first devices, and
  receive data from the other network device that is different from the first devices.

* * * * *